United States Patent [19]

Sakakibara

[11] 4,200,068
[45] Apr. 29, 1980

[54] ELECTRONIC ROTATION SPEED CONTROL SYSTEM FOR ENGINES

[75] Inventor: Naoji Sakakibara, Chiryu, Japan
[73] Assignee: Aisin Seiki Kabushiki Kaisha, Aichi, Japan
[21] Appl. No.: 898,083
[22] Filed: Apr. 20, 1978
[30] Foreign Application Priority Data
Apr. 21, 1977 [JP] Japan ................... 52/46472
[51] Int. Cl.² ........................................... F02D 37/00
[52] U.S. Cl. ............................... 123/102; 123/32 EA
[58] Field of Search ...... 123/102, 32 EA (U.S. only), 123/32 EA

[56] References Cited

U.S. PATENT DOCUMENTS

| | | | |
|---|---|---|---|
| 3,381,771 | 5/1968 | Granger et al. | 180/105 |
| 3,485,316 | 12/1969 | Slavin et al. | 180/105 |
| 3,613,820 | 10/1971 | Bozoian | 180/105 |
| 3,699,935 | 10/1972 | Adler et al. | 123/32 EA |
| 3,895,684 | 7/1975 | Takeshi et al. | 123/102 |
| 3,952,829 | 4/1976 | Gray | 123/102 |
| 3,998,191 | 12/1976 | Beyerlein et al. | 123/102 |
| 4,056,157 | 11/1977 | Kawata | 123/102 |
| 4,133,406 | 1/1979 | Allerdist | 123/102 |

*Primary Examiner*—Ira S. Lazarus
*Assistant Examiner*—Andrew M. Dolinar
*Attorney, Agent, or Firm*—Oblon, Fisher, Spivak, McClelland & Maier

[57] ABSTRACT

In a control system for electrically controlling rotation speed of an engine having a throttle valve and a fuel injection control apparatus to control fuel injection timing and duration in accordance with opening angle of the throttle valve, the control system comprises an integration circuit for integrating an output signal of the fuel injection control apparatus to generate an integrated signal indicative of the fuel injection timing and duration, a setting circuit for setting an instant value of the integrated signal as a command signal indicative of a desired set speed, a comparator coupled with the integration circuit and the setting circuit for comparing the integrated signal with the command signal to produce an output signal therefrom, and a servomotor for controlling the opening angle of the throttle valve in response to the output signal from the comparator to operate the engine at the desired set speed.

4 Claims, 4 Drawing Figures

ELECTRONIC ROTATION SPEED CONTROL SYSTEM FOR ENGINES

BACKGROUND OF THE INVENTION

The present invention relates to an electronic control system for an engine, and more particularly to an electronic rotation speed control system for an engine having an electronic fuel injection control apparatus.

SUMMARY OF THE INVENTION

The primary object of the present invention is to provide an electronic rotation speed control system for an engine wherein an electric signal indicative of rotation speed and torque of the engine is compared with a command signal indicative of a desired set speed to operate the engine at the desired set speed.

Another object of the present invention is to provide an electronic rotation speed control system, having the above-mentioned characteristics, wherein an output signal of a fuel injection control apparatus is integrated to obtain the electric signal indicative of rotation speed and torque and the command signal, thereby to eliminate undesired hunting phenomena of the vehicle.

According to the present invention, there is provided a control system for electrically controlling rotation speed of an engine having a throttle valve to control an amount of air sucked into the engine and a fuel injection control apparatus to control fuel injection timing and duration in accordance with opening angle of the throttle valve, the control system comprising:

an integration circuit for integrating an output signal of the fuel injection control apparatus to generate an integrated signal indicative of the fuel injection timing and duration;

setting means for setting an instant value of the integrated signal as a command signal indicative of a desired set speed;

a comparator coupled with the integration circuit and the setting means for comparing the integrated signal with the command signal to produce an output signal therefrom; and a servomotor for controlling the opening angle of the throttle valve in response to the output signal from the comparator to operate the engine at the desired set speed.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
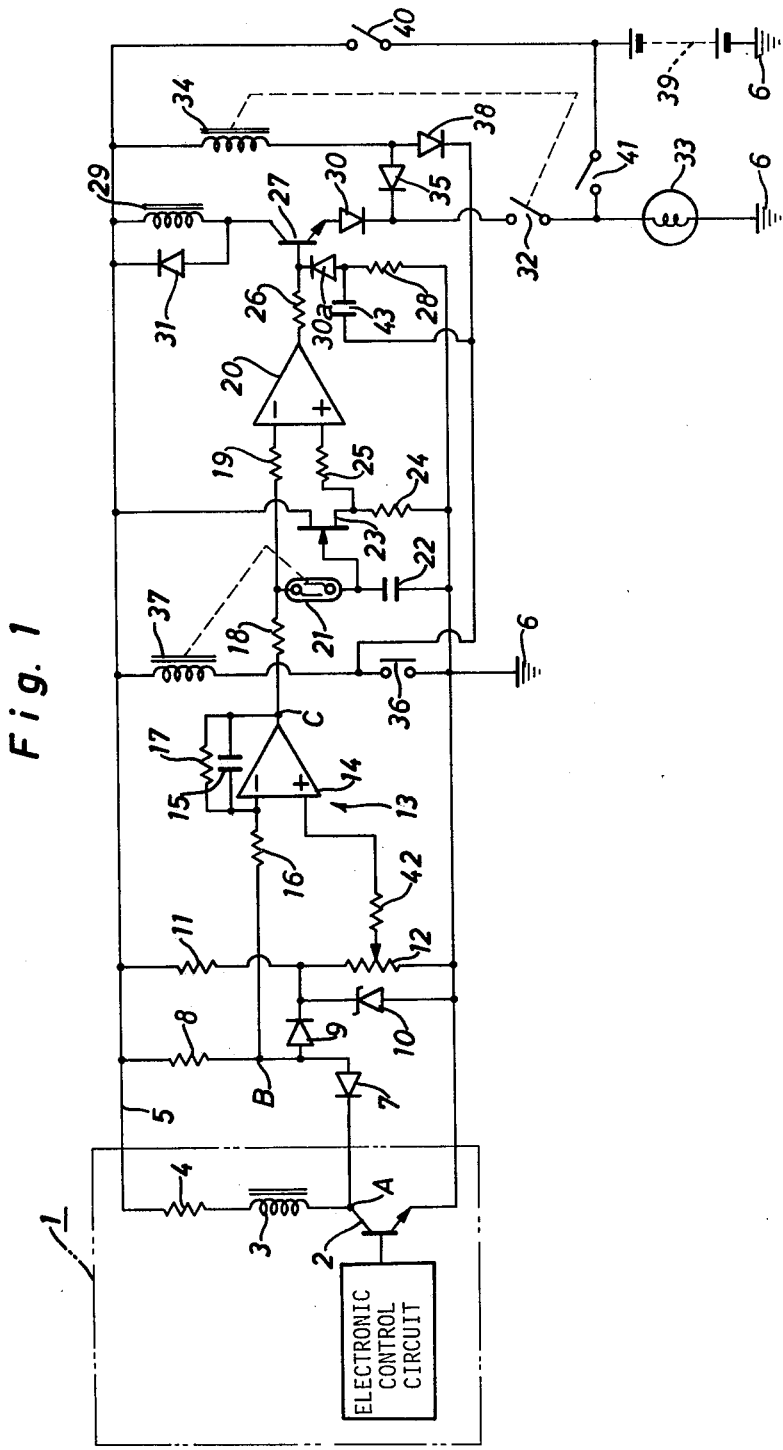
FIG. 1 illustrates a circuit diagram of an electronic rotation speed control system for an engine in accordance with the present invention.

Referring now to the drawings, there is illustrated an electronic rotation speed control system for an engine in accordance with the present invention. In FIG. 1, the reference numeral 1 illustrates a portion of an electronic fuel injection control apparatus in which an electronic control circuit is provided to generate a control signal therefrom in accordance with various input signals from an air flow meter, several thermo-sensors, an ignition timing sensor and the like, thereby to determine an optimum fuel injection timing and duration. The fuel injection control apparatus 1 is provided with a power transistor 2 which is connected at its base to the control circuit to receive the control signal thereto. The transistor 2 is connected at its collector to a power source line 5 through a solenoid winding 3 in series with a resistor 4 and is grounded at its emitter, as shown by the reference numeral 6. When the transistor 2 is conductive by receiving the control signal, the solenoid winding 3 is energized to activate a fuel injection valve (not shown) for supplying an amount of fuel into the engine. Simultaneously, a low level signal in the form of a voltage appears at the collector of transistor 2 or point A, as shown by the first chart (A) of FIG. 3. When the transistor 2 is non-conductive to deenergize the solenoid winding 3, the fuel injection valve is deactivated, and a high level signal in the form of a voltage appears at the point A.

From the above description, it will be noted that each time interval of the low level signals changes in accordance with an actual rotation speed of the engine or vehicle speed and that each width of the low level signals changes in accordance with rotation torque of the engine. Provided, the magnitude of each high level signal at the point A will be influenced by voltage fluctuations of an electric power source 39 in the form of a vehicle battery, as shown by columns (1), (2) and (3) of the first chart A in FIG. 3. A diode 7 is connected at its cathode to the collector of transistor 2 and at its anode to an input resistor 16 of an integration circuit 13. The anode of diode 7 is further connected to a clamper including a diode 9 and a zener diode 10 and is connected through a resistor 8 to the power source line 5. The diode 9 is connected at its cathode to the source line 5 through a resistor 11, and the zener diode 10 has its cathode connected to the cathode of diode 9 and its anode grounded. Thus, the clamper serves to clamp the high level signals applied from the point A to a junction point B between the diode 7 and the resistor 8. This results in uniformity of the high level signals appearing at the junction point B, as shown by the second chart (B) of FIG. 3. In addition, the low level signals from the point A are uniformed by function of the diode 7 so that uniform pulses are applied through the input resistor 16 to a minus input terminal of an operational amplifier 14 for the integration circuit 13.

A potentiometer 12 is connected in parallel with the zener diode 10 to adjust a reference signal applied to a plus input terminal of operational amplifier 14. For an actual practice, the resistance value of potentiometer 12 is previously determined in such a manner that the adjusted voltage may correspond with an average value of the low and high level signals appearing at the point B when the fuel injection valve is activated to maintain idling operation of the engine.

Figure 4:
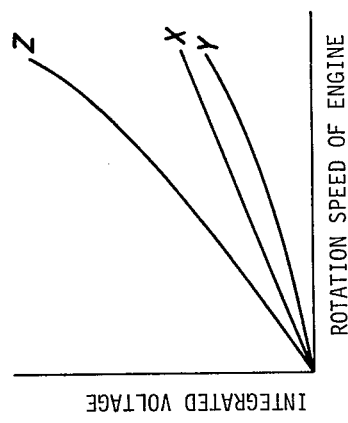
FIG. 4 is a graph representing a relationship between rotation speed of an engine and integrated voltage at the point C of the circuit diagram.

The integration circuit 13 comprises the resistor 16, the operational amplifier 14 and a capacitor 15 in parallel with a resistor 17 and has an output terminal or point C connected through resistors 18 and 19 to a minus input terminal of a comparator 20. In operation of the integration circuit, assuming that the fuel injection control apparatus operates to maintain idling operation of the engine, the integration circuit 13 acts to integrate the low and high level signals appearing at the point B in relation to the adjusted voltage from the potentiometer 12, thereby to generate an integrated output voltage at the point C. The integrated output voltage at the point C will take a low value and include ripples, as shown by the first column (1) of the third chart (C) in FIG. 3. When the fuel injection control apparatus operates to increase the rotation speed of the engine during idling, each time interval of the low level signals becomes shorter, as shown by the second column (2) of the second chart (B) in FIG. 3, and the integrated output voltage at the point C will take a high value, as shown by the second column (2) of the third chart (C) in FIG. 3. Thus, the integrated voltage at the point C will linearly change in relation to the rotation speed of the engine, as shown by a straight line X in FIG. 4.

Figure 3:
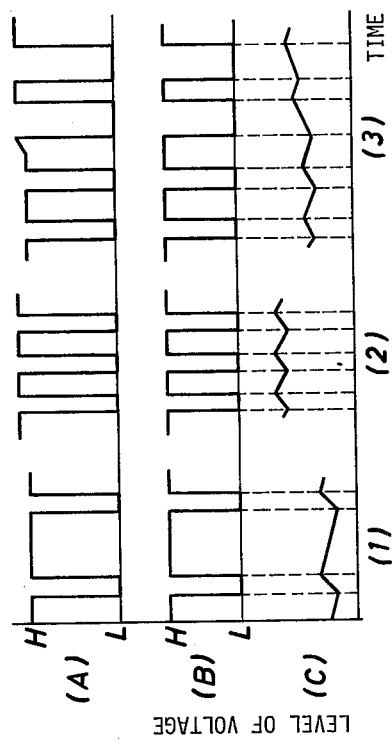
FIG. 3 includes a first chart (A) showing voltages at a point A of the circuit diagram, a second chart (B) showing voltages at a point B of the circuit diagram, and a third chart (C) showing integrated voltages at a point C of the circuit diagram.

When the fuel injection control apparatus operates to maintain a travel speed of the vehicle, each width of the low level signals at the point B becomes larger in accordance with increase of the vehicle load, as shown by the third column (3) of the second chart (B) in FIG. 3, and the integrated output voltage at the point C will change, as shown by the third column (3) of the third chart (C) in FIG. 3. In this instance, the integrated output voltage includes a factor representing rotation torque of the engine which increases in relation to the rotation speed, as shown by a non-linear line Y in FIG. 4. Thus, the integrated voltage will change in relation to the rotation speed and torque of the engine, as shown by a characteristic curve Z in FIG. 4, which is obtained from the characteristic lines X and Y.

A reed switch 21 is connected at one end thereof to a junction between resistors 18 and 19 and at the other end thereof to a memory capacitor 22. The reed switch 21 is to be closed by energization of a driving coil 37, and the memory capacitor 22 is grounded. A field-effect transistor 23, which is simply called as FET hereinafter, is connected at its gate terminal to a junction between the reed switch 21 and the memory capacitor 22 and is connected at its drain terminal to the power source line 5. The resistor 18 and the memory capacitor 22 act as a low pass filter to eliminate various ripples of the integrated output signals appearing at the point C. Thus, the memory capacitor 22 stores an average value of the integrated voltage from the integration circuit 13 to apply a stable memorized voltage to the gate of FET 23.

The source of FET 23 is connected through a resistor 25 to a plus input terminal of comparator 20 and is also grounded through a resistor 24. The comparator 20 is connected at its output terminal to the base of a transistor 27 through a resistor 26 and through a diode 30a to a differentiation circuit including a capacitor 43 and a resistor 28. The capacitor 43 is connected to a normally open set switch 36, and the resistor 28 is grounded. The collector of transistor 27 is connected through a solenoid winding 29 to the power source line 5, and the emitter of transistor 27 is connected to the anode of a diode 30. The solenoid winding 29 is connected in parallel with a diode 31 and it serves to operate a vacuum servomotor 45 shown in FIG. 2. The cathode of diode 30 is connected to the ground 6 through a normally open relay switch 32 and an indication lamp 33. The relay switch 32 is to be closed by energization of a driving coil 34, and the lamp 33 is connected through a brake switch 41 to the electric power source 39. The driving coil 34 is connected at one end thereof to the power source 39 through an ignition main switch 40 and at the other end thereof to anodes of diodes 35 and 38. The cathode of diode 35 is connected to the relay switch 32, and the cathode of diode 38 is connected to the set switch 36.

Figure 2:
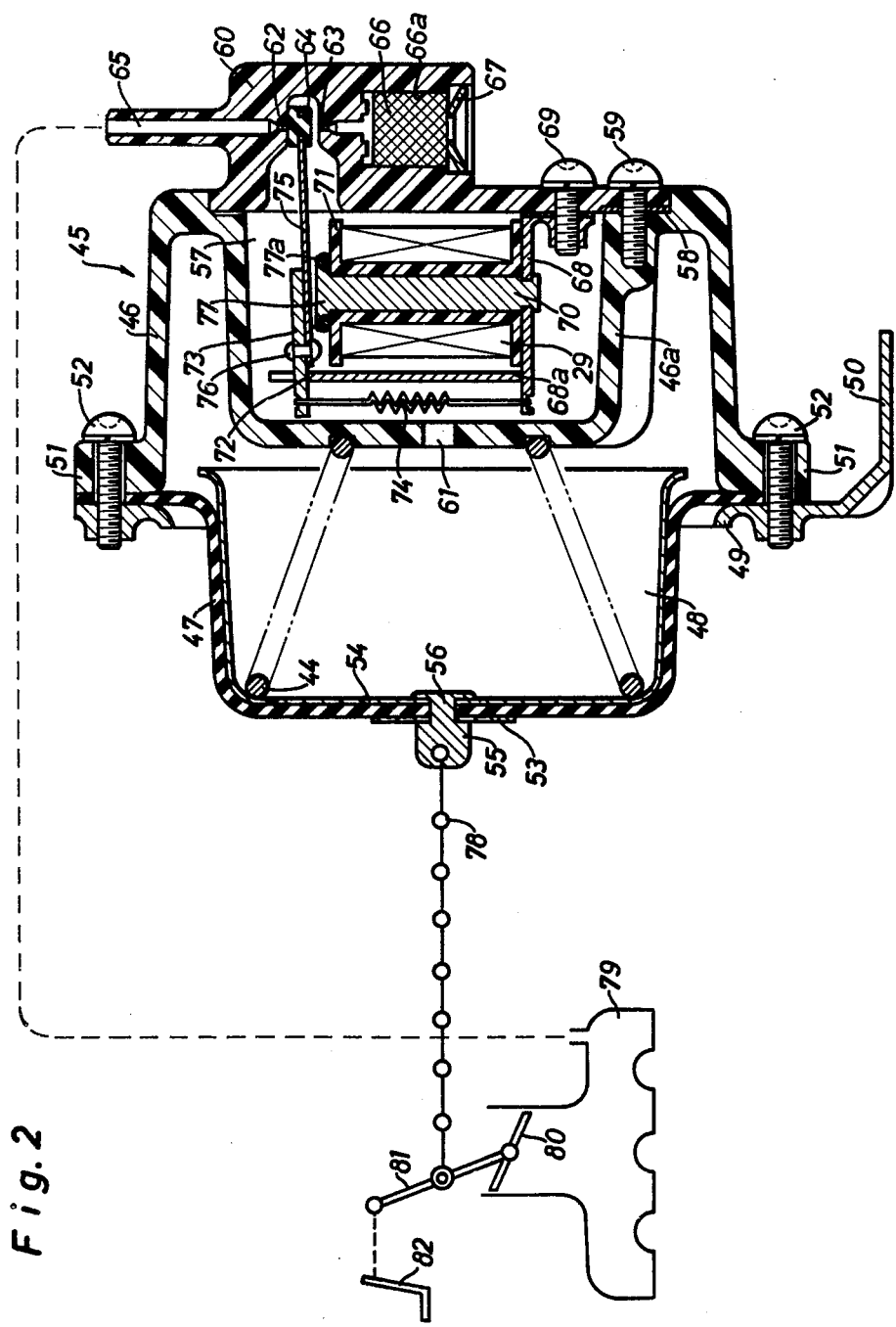
FIG. 2 is a sectional view of a vacuum servomotor controlled by the control system of FIG. 1.

FIG. 2 illustrates the construction of the vacuum servomotor 45 which is operated by energization of the solenoid winding 29. The servomotor 45 comprises a housing 46 of hard synthetic resin which is closed by a flexible diaphragm 47 to form a chamber 48 therein. The diaphragm 47 is hermetically secured at its annular periphery to an annular flange 51 of the housing 46 by an attachment plate 49. The attachment plate 49 is fastened to the housing 46 by screws 52 and has a mounting bracket 50 to be fixed to an appropriate portion of the vehicle body structure. A cup-shaped rigid member 54 is fastened to the diaphragm 47 by a rivet 56 through a washer plate 53 to retain the shape of diaphragm 47. A spiral spring 44 is interposed between the rigid member 54 and an inner wall of the housing 46 to bias the diaphragm 47 outward. The rivet 56 is provided with a head 55 which is operatively connected to a bell-crank 81 by way of a chain-linkage 78. The bell-crank 81 is connected at one end thereof with an accelerator pedal 82 through a suitable linkage and at the other end thereof with a throttle valve 80, thereby to control an amount of air sucked into an intake manifold 79 of the engine.

The housing 46 is provided with a concaved wall 46a which is closed by a cover member 60 to form a chamber 57 therein. The concaved wall 46a has a hole 61 allowing air into the chamber 48, and the cover member 60 is hermetically secured to the housing 46 through an annular gasket 58 by means of fastening screws 59. The cover member 60 is provided at the upper portion thereof with an extension pipe 65 allowing vacuum tubing to be attached thereto and at the lower portion thereof with a cavity 66a containing an air filter 66. The extension pipe 65 is connected at one hand thereof to the intake manifold 79 by way of the vacuum tubing and is selectively communicated at the other hand thereof into the chamber 57 through a vacuum nozzle 62. The cavity 66a is selectively communicated into the chamber 57 through an air nozzle 63, and the air filter 66 is disposed in place by a stop ring 67. The nozzles 62 and 63 are opposed to each other to be closed by a valve member 64. When the nozzle 62 is closed by the valve member 64, the chamber 57 is exposed to the atmospheric pressure through the nozzle 63 and the air filter 66. When the nozzle 63 is closed by the valve member 64, the chamber 57 is communicated to vacuum pressure appearing at the intake manifold 79 through the nozzle 62, the extension pipe 65 and the tubing.

A support frame 68 of magnetic material is fastened to the inner wall of cover member 60 by screws 69 and is provided thereon with a strut 68a. A magnetic pole 70 is riveted at its bottom end on the support frame 68 and is provided at its upper end with an annular shock absorber 77a. The solenoid winding 29 shown in FIG. 1 is wound on a bobbin 71 which is secured on the support frame 68 by means of the magnetic pole 70. An armature 73 of magnetic material is swingable supported at a fulcrum 72 on the strut 68a of frame 68 and is biased by a spring 74 in a direction apart from the magnetic pole 70. A resilient plate 75 of non-magnetic material is fastened to the armature 73 by a rivet 76 and supports the valve member 64 at the free end thereof.

In assembly of the vacuum servomotor 45, it will be noted that the valve member 64 is previously assembled in a position to obtain a good sealing effect, and thereafter the support frame 68 is mounted to the cover member 60. This facilitates the alignment of valve member 64 in relation to the opposed nozzles 62 and 63 and wiring of the solenoid winding 29 out from the servomotor 45.

In operation of the vacuum servomotor 45, during deenergization of the solenoid winding 29, the valve member 64 attached on the resilient plate 75 closes the vacuum nozzle 62 due to biasing force of the spring 74, while the air nozzle 63 is opened to communicate the chamber 48 to the atmospheric pressure through the hole 61 and the chamber 57. This expands the diaphragm 47 loaded by the spring 44 to close the throttle valve 80. When the solenoid winding 29 is energized, the armature 73 and the pole 70 are magnetized to attract the armature 73 to the pole 70 against biasing force of the spring 74. Upon attraction of the armature 73, the resilient plate 75 is moved downward so that the valve member 64 opens the vacuum nozzle 62 and closes the air nozzle 63. In this instance, the resilient plate 75 is initially engaged with the shock absorber 77a and subsequently abuts against the head 77 of pole 70. This eliminates impact on the pole 70 to prevent unpleasant noises. As a result of opening the vacuum nozzle 62, vacuum from the intake manifold 79 is drawn into the chamber 48 through the chamber 57 and the hole 61 such that the diaphragm 47 is moved against biasing force of the spring 44 to open the throttle valve 80. If the solenoid winding 29 is energized in a long period of time, the retracting movement of diaphragm 47 becomes large to increase the opening angle of throttle valve 80. In addition, it will be noted that the energizing duration of solenoid winding 29 is properly determined by function of the differentiation circuit of the control system as described later.

When the solenoid winding 29 is subsequently deenergized, the resilient plate 75 is separated from the pole 70 due to biasing force of the spring 74 so that the valve member 64 opens the air nozzle 63 and closes the vacuum nozzle 62. This communicates the chamber 48 to the atmospheric pressure through the hole 61 and the chamber 57, and in turn, the diaphragm 47 is moved by biasing force of the spring 44 to close the throttle valve 80. In this instance, as the non-magnetic plate 57 is positioned between the armature 73 and the pole 70, the armature 73 quickly separates from the pole 70 upon deenergization of the solenoid winding 29. This serves to enhance the operational response of the servomotor 45.

Hereinafter, the mode of operation of the engine speed control system will be described in detail. When the ignition switch 40 is closed to start the engine and the fuel injection control apparatus 1 operates to maintain idling operation of the engine, the integration circuit 13 integrates the low and high level signals appearing at the point B in relation to the reference voltage from the potentiometer 12 to generate at the point C an integrated voltage in proportion to rotation speed of the engine. Under this condition, if the operator closes the set switch 36 to energize the driving coils 34 and 37, the relay switch 32 and the reed switch 21 are closed. Then, the lamp 33 is lit to indicate operative condition of the control system, and the memory capacitor 22 memorizes therein an average value of an instant integrated voltage appearing at the point C as a command signal. Upon opening the set switch 36, the driving coil 37 is deenergized such that the differentiation circuit temporarily generates an output signal therefrom to be applied to the base of transistor 27. On the other hand, the driving coil 34 serves to provide a self-holding circuit to continuously close the relay switch 32, and the comparator 20 receives at its minus terminal an instant integrated voltage from the integration circuit 13 and at its plus terminal the memorized voltage applied from the capacitor 22 through FET 23.

In such an operative condition of the control system as mentioned above, if the rotation speed of the engine decreases to lower an instant voltage at the point C below the level of memorized voltage, the comparator 20 produces a high level voltage therefrom which is applied to the base of transistor 27. Then, the transistor 27 is turned-on to energize the solenoid winding 29 so as to open the throttle valve 80. If the rotation speed of the engine increases to rise an instant integrated voltage at the point C above the level of memorized voltage, the comparator 20 produces a low level voltage therefrom to make the transistor 27 non-conductive. This causes deenergization of the solenoid winding 29 to close the throttle valve 80. Thus, the engine is driven at a desired set speed constantly.

If the operator closes the set switch 36 during a travel of the vehicle, the driving coils 34 and 37 are energized to close the relay switch 32 and the reed switch 21. This memorizes in the memory capacitor 22 an average value of an instant integrated voltage appearing at the point C as a command signal. When the set switch 36 is opened, the differentiation circuit temporarily generates an output voltage therefrom. Then, the transistor 27 is turned-on due to the output voltage from the differentiation circuit so that the solenoid winding 29 is temporarily energized to operate the servomoter 45. This maintains the opening angle of the throttle valve 80 to hold the travel speed of the vehicle in spite of releasing of the accelerator pedal 82. The transitional operation of the servomotor 45 is previously decided by capacitance of the capacitor 43 in accordance with the desired set speed of the vehicle. Thereafter, the output voltage of the differentiation circuit ceases, and the driving coil 34 serves to provide the self-holding circuit to continuously close the relay switch 32. As a result, the comparator 20 receives at its minus terminal an instant integrated voltage from the integration circuit 13 and at its plus terminal the memorized voltage from the capacitor 22.

Under the operative condition of the control system, if the vehicle is ascending hill, the travel speed will decrease due to increase of the vehicle load. This will tend to lower the integrated voltage at the point C below the level of memorized voltage. Then, the comparator 20 generates a high level voltage therefrom to make the transistor 27 conductive. This causes energization of the solenoid winding 29 to operate the servomotor 45 so as to increase the opening angle of the throttle valve 80. If the vehicle is descending hill, the travel speed will increase due to decrease of the vehicle load. This will tend to rise the integrated voltage at the point C above the level of memorized voltage. Then, the comparator 20 generates a low level voltage therefrom to make the transistor 27 non-conductive. This causes deenergization of the solenoid winding 29 to deactivate the servomotor 45 to decrease the opening angle of the throttle valve 80.

In such a control of the travel speed as mentioned here, it should be understood that the integrated voltage includes various ripples, as shown by the third column (3) of the third chart (C) in FIG. 3. Each of the ripples corresponds with a cycle of fuel injection and includes factors representing the rotation speed and torque of the engine. Assuming that the vehicle is travelling on a plane road, the rotation speed and torque of the engine will change in accordance with a vehicle load such as an adverse wind. Then, the ripples of the integrated voltage will change in response to operation of the fuel injection control apparatus. As a result, the comparator 20 produces low and high level voltages in accordance with variations of the above-noted ripples in relation to the level of memorized voltage. This means that the solenoid winding 29 of servomotor 45 is alternatively energized and deenergized in accordance with the high and low level voltages from the comparator 20. Additionally, each energizing duration of the solenoid winding 29 will change in accordance with the ripples of the integrated voltage in relation to the level of memorized voltage. Thus, the servomotor 45 is operated in accordance with an actual rotation speed and torque of the engine to maintain the travel of vehicle at a desired set speed.

Furthermore, it should be understood that when the rotation speed and torque of the engine is controlled by the fuel injection control apparatus 1 under the operative condition of the engine speed control system, the integrated voltage at the point C changes prior to an actual variation of the rotation speed and torque of the engine. Thus, the opening angle of the throttle valve 80 is controlled by operation of the servomotor 45 before the actual rotation speed reaches the desired set speed. This serves to eliminate undesired hunting phenomena of the vehicle under operative condition of the system.

Finally, the operative condition of the engine speed control system is released by closing the brake switch 41. When the brake switch 41 is closed, the driving coil 34 is deenergized to open the relay switch 32 and the solenoid winding 29 is deenergized to deactivate the servomotor 45.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A control system for electrically controlling rotational speed of an engine having a throttle valve to control an amount of air sucked into said engine and a fuel injection control apparatus to produce an output signal related to the actual rotational speed and torque of said engine and including means for controlling fuel injection frequency and duration in response to the output signal, the control system comprising:
    an integration circuit for integrating the output signal from said fuel injection control apparatus to generate an integrated signal indicative of the actual rotational speed and torque of said engine;
    setting means for setting an instant value of the integrated signal as a command signal indicative of a desired set speed;
    a comparator coupled with said integration circuit and said setting means for comparing the integrated signal with the command signal to produce an output signal therefrom; and
    a servomotor for controlling the opening angle of said throttle valve in response to the output signal from said comparator to operate said engine at the desired set speed.

2. A control system as set forth in claim 1, further comprising a potentiometer for generating a reference signal therefrom; and wherein said integration circuit is to integrate the output signal from said fuel injection control apparatus in relation to said reference signal so as to produce an integrated signal.

3. A control system as set forth in claim 1, wherein said setting means comprises a first normally open switch to be closed by the operator when said engine operates at a desired speed; a second normally open switch to be closed in response to closure of said first switch; a resistor interposed between said integration circuit and said comparator; a memory capacitor connected to a junction between said resistor and said comparator through said second switch to memorize an instant value of the integrated signal as a command signal; and a field effect transistor for applying the command signal to said comparator from said capacitor.

4. A control system as set forth in claim 3, further comprising a differentiation circuit for temporarily generating an output signal therefrom upon opening said first switch, said servomotor controlling the opening angle of said throttle valve in response to the output signal from said differentiation circuit to transitionally maintain the desired set speed of said engine.

* * * * *